United States Patent Office 2,806,971
Patented Sept. 17, 1957

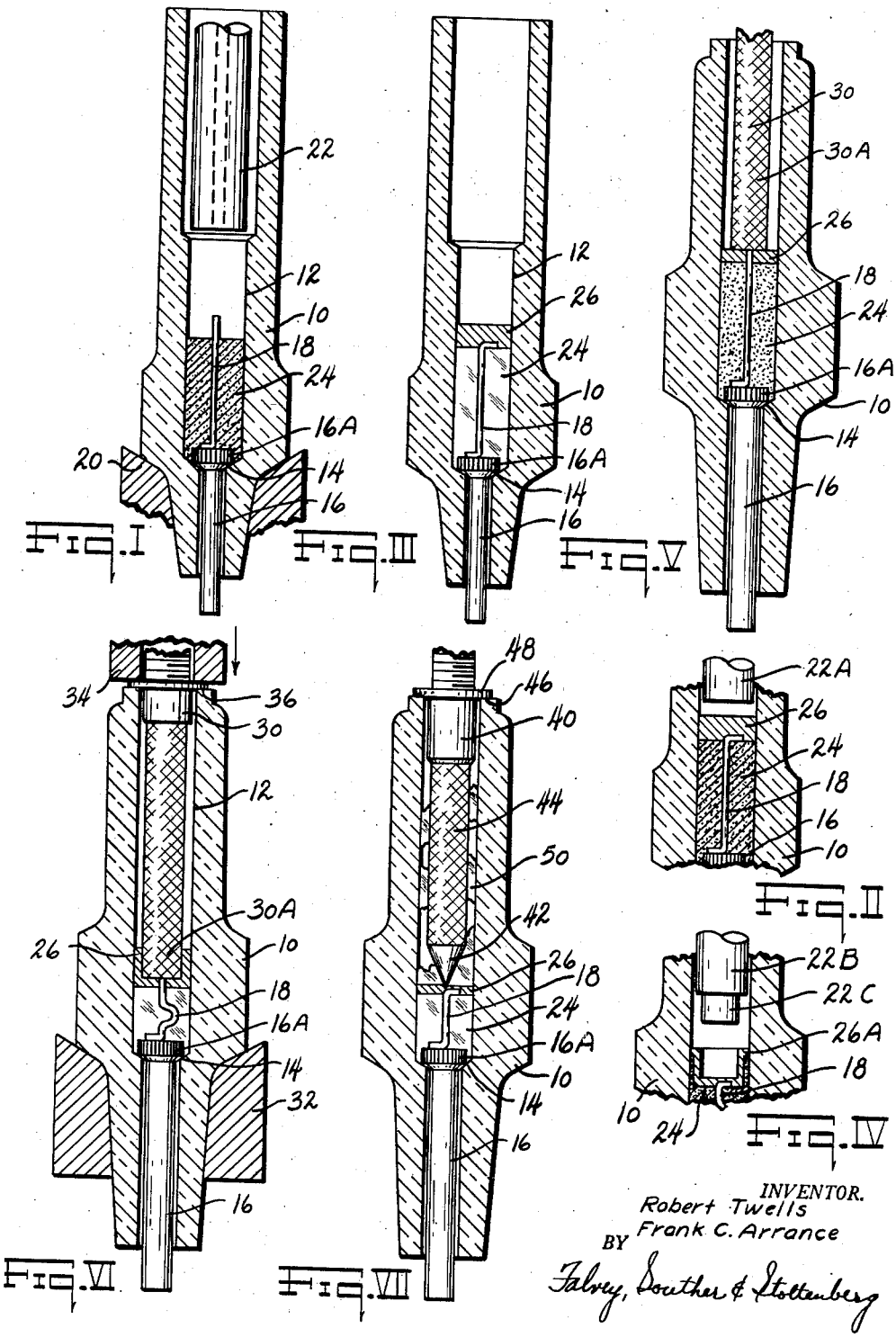

2,806,971

GLASS SEAL FOR SPARK PLUG ELECTRODE ASSEMBLY

Robert Twells and Frank C. Arrance, Fostoria, Ohio

Application May 21, 1952, Serial No. 289,096

2 Claims. (Cl. 313—136)

This invention relates to glass seals for spark plugs, more particularly to glass seals for center electrodes positioned in the bore of a ceramic insulator adapted for fabrication in a mass production line.

Glass seals for center electrodes for spark plugs are known in the prior art and have been used in a mass production line, but have had the disadvantage that after the glass is fused it is necessary to place pressure upon the glass by mechanical means in order to have the glass engage the electrode and the insulator intimately to form the seal. This could only be done outside of the furnace which meant manual manipulation of parts at relatively high temperatures in order to apply pressure to the glass which is not an easy step in a mass production line. Furthermore, the high temperatures of the metal parts, when exposed to the atmosphere during the pressing operation, caused an excessive oxidation of these metal parts, which destroyed their appearance and also their electrical efficiency by creating contact difficulty, so that a cleaning operation was required. Open electrical circuits too were not uncommon.

The present invention contemplates a glass seal for spark plugs which is suited for mechanization in a mass production line and which obviates the difficulties mentioned hereinbefore with reference to the prior art. The invention contemplates a process which is continuous rather than an intermittent one, so that the metal parts need not be removed from the furnace at high temperatures into the atmosphere to become strongly oxidized but remain in the furnace in a controlled reducing atmosphere until sufficiently cooled to be brought into the atmosphere without oxidation.

The invention further contemplates the provision of a glass seal using metallic connector elements in touching relation, through which an electric circuit is to be established, which assures good conductivity between the elements after being subjected to the heat of fusion for the glass without the use of techniques which cannot be readily applied in the furnace such as welding etc.

The invention further contemplates the provision of a method of forming glass seals wherein an electric circuit is made between contacting elements by the use of sintered metal powders, which are compacted in position to obviate shrinkage before firing.

The invention further contemplates the provision of a method of making a glass seal with metallic elements in touching relation wherein glass and metal powders are compacted in layers to obviate shrinkage and to provide a seal by heating alone without mechanical compression after fusion of the glass.

It is, therefore, a principal object of this invention to provide a glass seal for use in spark plugs wherein the elements of the seal are in powder form compacted in position around metallic elements and then heated by passing through a high temperature zone to complete the seal.

It is a further object of this invention to provide a method of sealing an electrode in the bore of an insulator of a spark plug which is continuous and in which the sealing elements are subjected to high fusing temperatures in a protective atmosphere wherein no mechanical pressure is applied at high temperatures.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a sectional elevation showing a preparatory step in carrying out the invention;

Fig. 2 is a similar view showing another preparatory step;

Fig. 3 is a sectional elevation of a completed spark plug;

Fig. 4 is a view similar to Fig. 3 showing a modification;

Fig. 5 is a sectional elevational view of a modification;

Fig. 6 is the same as Fig. 5 after mechanical compression; and

Fig. 7 is a sectional elevational view of still another modification.

In carrying out the invention, a spark plug insulator 10 is provided, such as shown in Figs. 1 and 5 of the drawings, illustrating two types of insulators capable of being utilized although the invention is capable of being applied to insulators of all types wherein a metallic member is to be sealed hermetically in a bore. Spark plug insulators are preferably made of a high percentage of alumina bonded together into a homogeneous body by agents having lower melting points, such as fluxes and the like, as are well known in the art.

The insulator 10 is provided with a longitudinal bore 12 which is provided with an internal shoulder 14 adjacent the lower end of the insulator to provide a seat for a headed firing electrode 16 positioned in the lower portion of the bore and adapted to project from the insulator as is well known in spark plug construction. This firing electrode is generally made of nickel-manganese alloys for durability against high temperatures and to prevent excessive erosion due to the spark.

The head of the electrode is knurled at its outer perimeter 16A to form a mechanical interlock with the glass fused thereabout as will be described further hereinafter. The head is also provided with a pigtail 18 preferably welded to its upper surface to project longitudinally upwardly therefrom as is clearly shown in Fig. 1. The pigtail 18 is a hair-like wire fabricated from a special alloy of iron-nickel and cobalt commercially sold under the trade name "Kovar" and fully described in Patent No. 1,942,260 although it can also be fabricated from molybdenum or tungsten if desired. This alloy and these pure metals are suitable for use with borosilicate glasses to form glass to metal seals, while, at the same time, the glass "wets" the bore of the insulator to form a seal between the ceramic and the metal to allow electrical connection to be made with the electrode 16 while sealing the bore 12 of the insulator to prevent escape of hot gases therethrough when the spark plug is used in an engine with the firing tip of the electrode and insulator extending into the combustion chamber where relatively high pressures are encountered.

The pigtail 18 is first welded to the electrode 16 and the assembly is then dropped into the bore of the insulator as shown in Fig. 1. The insulator is then positioned on an anvil 20 in concentric relation with a ram 22 which is adapted to enter the bore 12, being preferably of hollow construction, so that the pigtail will not be bent during the compacting operation of a body of powdered glass 24 above the shoulder 14 around the pigtail 18 and the head of the electrode 16. The glass is finely powdered and compacted in position in layers to obtain homogeneous compression and greater density. The depth of the compacted glass is not critical but may vary considerably although in a usual spark plug a depth of packed glass from ⅛ to ¼ inch is desirable. The force applied to the ram may vary and an impact blow is best to obtain the greatest density in the compacted glass, so that shrinkage upon fusion is reduced to a minimum, if not completely obviated.

The depth of the glass pack 24 must allow the pigtail to extend above it, as shown in Fig. 1, so that electrical connection can be made therewith. To obtain this electrical connection with the pigtail 18, a body of compacted metal powder 26 in a relatively thin layer is utilized positioned in the bore 12 around the terminus of the pigtail projecting above the pack of powdered glass which has just been positioned in the bore as described hereinabove. The same ram 22 can be used for this purpose or a solid ram 22A, Fig. 2, may be used. The metal powder to be used must be capable of being sintered at the temperature which will fuse the glass to make the seal as will be further described hereinafter, and iron has been found to sinter successfully under these conditions. The iron utilized is finely powdered and is compacted in position above the glass to obtain maximum density under the compacting conditions.

It may be desirable under certain conditions to give the iron powder special forms, such as a cup shape 26A, as is shown in Fig. 4, which can be obtained by using a special ram 22B having a boss 22C on its lower end to compact the iron powder into the desired shape, which it will retain after firing by sintering permanently. For most purposes, a simple layer of sintered iron is satisfactory as shown in Figs. 2 and 3.

The insulator is now ready for firing, which will fuse the glass and, in fusing, will "wet" both the pigtail 18 and the bore 12 of the insulator to form a hermetic seal for the bore, through which electric current can flow through the agency of the metallic pigtail. The glass, by fusing, will not shrink substantially inasmuch as the compacting of the powdered glass before firing, as already described, has reduced the volume of the interstices to a minimum, so that substantial shrinkage of the glass body is obviated. Firing also sinters the powdered iron layer to rigidity with close contact to the protruding end of the pigtail establishing an electrical circuit between the sintered iron layer and the electrode 16 even at low voltages such as 110 A. C. which is convenient to use for automatic testing purposes in a mass production line, so that no open circuits will pass the automatic test and ultimately result in a defective spark plug.

The firing occurs in a furnace provided with a protective atmosphere reducing in nature, so that no oxides will form on the metallic parts. The temperature of firing is selected by considering the nature of the glass constituents their fusing temperature and the sintering temperature of the powdered metal used in the upper layer. The insulators are placed in the furnace on a simple belt conveyor and are slowly heated to the required temperature and then allowed to remain in the protective atmosphere of the furnace until their temperature has dropped sufficiently to bring safely into the normal atmosphere without oxidation of the metal parts. The process is a continuous one and very adaptable to a mass production line.

The seal formed between these three elements, the insulator bore, the glass element, and the pigtail is absolute with zero leakage under all temperatures under which the spark plug is required to operate. The insulator is one of the alumina type having an expansion coefficient of 7.0 to 7.5×10$^{-6}$, and the glass is one of the borosilicate glasses having an expansion coefficient of 3.0 to 6.7×10$^{-6}$ a preferred borosilicate glass having a coefficient of 3.2×10$^{-6}$ having 80.5% $SiO_2$, 12.9% $B_2O_3$, 3.8% $Na_2O_3$, 0.4% KO and 2.2% $Al_2O_3$ sold as No. 7740 by Corning Glass works, Corning, New York. The pigtail of Kovar has an expansion coefficient of approximately 3.5×10$^{-6}$. The coefficients of expansion are chosen to form a pressure type seal, wherein the insulator, being the largest and strongest element of the combination, compresses the glass and the glass compresses the pigtail, or the metallic member through a substantial portion of the temperature range to which the seal is subjected when used in a spark plug.

The layer of powdered glass and the layer of powdered metal can be poured loosely into the bore of the insulator around the pigtail and then compressed in one step rather than in several steps as described hereinbefore with the firing occurring thereafter. This is, however, not as efficient because the density of the compacted material is not as great with the interstices between the particles being larger resulting in more shrinkage on firing.

When an upper terminal piece 30 is required for the spark plug insulator, as shown in Figs. 5 and 6, the layers of powdered glass and powdered iron can be positioned by either method described hereinbefore and fired with the terminal element 30 resting on the top surface as shown in Fig. 5. The weight of the terminal element is not sufficient to cause it to sink into the fused and sintered powdered materials during firing, so that the assembly must be removed from the furnace while at the fusing temperature of the glass and placed in an anvil 32 and pressed together by arbor 34, so that the terminal element is forced into the seal until the shoulder 36 of the terminal element contacts the top of the insulator. This requires manual handling of red hot parts which is not convenient or desirable on a production line and also the high temperatures cause excessive oxidation of the metal parts when contacted by the atmosphere. The powdered iron also tends to oxidize but, when sintered under these conditions, it is still an effective means to provide electrical contact between the terminal element 30 and the pigtail, and thereby illustrates one aspect whereby one feature of the invention can be carried into practice. The external application of mechanical pressure at high temperatures does not lend this modification to application in a mass production line. The bottom end 30A of the terminal piece is knurled to provide overhanging portions which form a mechanical interlock with the sintered iron and fused glass to hold the terminal piece 30 permanently in the insulator bore. The sintered iron and fused glass tend to flow upwardly along the terminal piece as shown in Fig. 6.

Substantially the same result can be reached, although not as efficiently, when the powdered glass and powdered iron are loosely poured around the pigtail and fired without the compacting step, and when the fused condition of the glass is reached, the terminal element again pushed down by mechanical pressure at the high temperature. The powdered iron again becomes sintered and is effective to make contact between the terminal element and the pigtail.

The preferred modification of the invention where an upper terminal piece is necessary is shown in Fig. 7. Here a terminal 40 is provided with a sharpened lower end 42 and knurling 44, and also having a shoulder 46 formed by a flange 48 to cooperate with the upper end of the insulator 10 as before. Otherwise, the sealing element may be the same as in the modification shown in Fig. 1. The powdered borosilicate glass 24 and the layer 26 of powdered iron are positioned, as set forth hereinbefore, with both layers being compacted as disclosed. The terminal piece 40 is then provided with a second glass element 50 which cooperates with the bore 12 of the insulator above the iron powder layer 26 and adjacent the knurled portion 44 to form a mechanical interlock between the insulator bore and the terminal 40 to permanently hold it in position in the bore with the flange 48 resting on the insulator top. The glass element 50 is also in powdered form before firing and may be of the same glass type as the element 24 which forms the seal about the pigtail or it may be of a different glass preferably having a lower fusing temperature.

The glass, in powdered condition may be formed as a slurry with the addition of water with or without a binding or floating agent and positioned on the terminal element 40 by dipping to form a coating thereon and then positioned in the bore of the insulator, so that the shoulder 46 rests on the insulator top while the pointed lower end 42 pierces and is in close contact with the powdered iron layer 26. The whole assembly is then fired as before and will fuse together to form the completed insulator without the use of mechanical pressure applied at the high temperatures as disclosed with reference to the modification shown in Figs. 5 and 6. The furnace will again have the reducing atmosphere to prevent oxidation of the metal elements and can be made to operate continuously with this modification. The upper glass element 50 does not influence the seal, but provides a mechanical interlock for the terminal piece to hold it permanently in position in the insulator.

Instead of forming a slurry of the powdered glass of the element 50, the powdered glass can be poured in loose, dry condition in the bore 12 of the insulator 10 above the compacted iron powder 26, and the terminal element 30 positioned therein by a turning motion until the shoulder 46 rests on the insulator top and the tip 42 is in contact with the iron powder layer. The assembly is then fired as before.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a spark plug, a ceramic insulator consisting of a high percentage of aluminum oxide having a central bore with a shoulder in an intermediate position, a lower electrode element having a head resting on said shoulder and extending downwardly to protrude from the lower end of the insulator to form a firing tip, a metal pigtail permanently attached to the head of the electrode element and extending upwardly in the bore of the insulator, a compacted element of powdered borosilicate glass positioned about the pigtail and in the adjacent portion of the insulator bore to form a hermetic seal when fused in the bore, the expansion coefficients of the metal of the pigtail, the glass of the sealing element, and the insulator being selected so that the fused glass sealing element is under compression in the insulator bore in the normal operating ranges of the spark plug, a layer of powdered metal compacted in position above the powdered glass surrounding the upper terminus of the pigtail and making electrical contact therewith, a terminal element inserted in the upper end of the bore of the insulator having a shoulder resting on the upper end of the insulator and having an undercut portion extending downwardly to contact the powdered metal element to establish electrical conductivity between the terminal element and the lower firing tip electrode element and having a layer of agglomerated powdered glass adhering to at least a part of the terminal element beneath the shoulder, said assembly being adapted to be heated as a single step to fuse the powdered glass positioned adjacent the metal pigtail to form a hermetic seal for the bore of the insulator, and to sinter the powdered metal in the bore of the insulator to form a contactual means between the terminal and electrode element by engaging the pigtail, and also to fuse the layer of powdered glass adhering to the terminal element to mechanically interlock with the undercut portion to hold the terminal element in the bore of the insulator.

2. In a spark plug, a ceramic insulator consisting of a high percentage of aluminum oxide having a central bore with a shoulder in an intermediate position, a lower electrode element having a head resting on said shoulder and extending downwardly to protrude from the lower end of the insulator to form a firing tip, a metal pigtail permanently attached to the head of the electrode element and extending upwardly in the bore of the insulator, a powdered glass sealing element compacted in position about the pigtail and in the adjacent portion of the insulator bore to form a hermetic seal when fused in the bore, the expansion coefficients of the metal of the pigtail, the glass of the sealing element, and the insulator being selected so that the fused glass sealing element is under compression in the insulator bore in the normal operating ranges of the spark plug, a layer of powdered metal compacted in position above the powdered glass surrounding the upper terminus of the pigtail and making electrical contact therewith, a terminal element inserted in the upper end of the bore of the insulator having a shoulder resting on the upper end of the insulator and having a serrated portion extending downwardly to contact the powdered metal element to establish electrical conductivity between the terminal element and the lower firing tip electrode element and having a layer of powdered glass adhering to at least a part of the serrated portion of the terminal element, said assembly being adapted to be heated as a single step to fuse the powdered glass positioned adjacent the metal pigtail to form a hermetic seal for the bore of the insulator, and to sinter the powdered metal in the bore of the insulator to form a contactual means between the terminal and electrode elements by engaging the pigtail, and also to fuse the layer of powdered glass adhering to the terminal element to mechanically interlock the terminal element in the bore of the insulator.

References Cited in the file of this patent

UNITED STATES PATENTS

| | | |
|---|---|---|
| 2,100,187 | Handrek | Nov. 23, 1937 |
| 2,265,352 | Corbin et al. | Dec. 23, 1941 |
| 2,267,571 | McDougal | Dec. 23, 1941 |
| 2,293,381 | Carington | Aug. 18, 1942 |
| 2,317,305 | Schwartzwalder et al. | Apr. 20, 1943 |
| 2,321,840 | McDougal | June 15, 1943 |
| 2,436,644 | Halstead | Feb. 24, 1948 |
| 2,508,354 | Brinson | May 23, 1950 |
| 2,696,652 | Cronin | Dec. 14, 1954 |